(12) United States Patent
Strock et al.

(10) Patent No.: US 12,529,321 B2
(45) Date of Patent: Jan. 20, 2026

(54) SEGMENTED CERAMIC COATING INTERLAYER

(71) Applicant: RTX Corporation, Farmington, CT (US)

(72) Inventors: Christopher W. Strock, Kennebunk, ME (US); Paul M. Lutjen, Kennebunkport, ME (US)

(73) Assignee: RTX CORPORATION, Farmington, CT (US)

( * ) Notice: Subject to any disclaimer, the term of this patent is extended or adjusted under 35 U.S.C. 154(b) by 1086 days.

(21) Appl. No.: 15/026,747

(22) PCT Filed: Sep. 17, 2014

(86) PCT No.: PCT/US2014/056061
§ 371 (c)(1),
(2) Date: Apr. 1, 2016

(87) PCT Pub. No.: WO2015/050706
PCT Pub. Date: Apr. 9, 2015

(65) Prior Publication Data
US 2016/0251970 A1    Sep. 1, 2016

Related U.S. Application Data

(60) Provisional application No. 61/885,757, filed on Oct. 2, 2013.

(51) Int. Cl.
*F01D 5/28* (2006.01)
*F01D 9/02* (2006.01)
(Continued)

(52) U.S. Cl.
CPC ............... *F01D 5/284* (2013.01); *F01D 9/02* (2013.01); *F01D 11/08* (2013.01); *F01D 11/125* (2013.01);
(Continued)

(58) Field of Classification Search
CPC ........ F01D 5/288; F01D 11/122; F01D 11/08; F01D 5/286; F01D 5/14; F01D 5/284; F01D 5/28; B32B 3/00; B32B 3/30
See application file for complete search history.

(56) References Cited

U.S. PATENT DOCUMENTS 4,422,648 A    12/1983 Eaton et al.
5,419,971 A    5/1995 Skelly et al.
(Continued)

OTHER PUBLICATIONS

European Search Report for European Application No. 14850554.8, dated Jun. 27, 2017, 8 pages.
(Continued)

*Primary Examiner* — Adam C Krupicka
(74) *Attorney, Agent, or Firm* — CANTOR COLBURN LLP

(57) ABSTRACT

A turbine article includes a substrate with a geometric surface feature having a plurality of recesses recessed into the substrate. A ceramic topcoat is disposed over the geometric surface feature. The topcoat includes portions that are separated by faults extending through the topcoat from the geometric surface feature so the topcoat is segmented. A ceramic interlayer is disposed between the topcoat and the geometric surface feature.

10 Claims, 2 Drawing Sheets

(51) Int. Cl.
  *F01D 11/08* (2006.01)
  *F01D 11/12* (2006.01)
  *F23R 3/00* (2006.01)

(52) U.S. Cl.
  CPC .......... *F23R 3/002* (2013.01); *F05D 2220/32* (2013.01); *F05D 2230/90* (2013.01); *F05D 2240/35* (2013.01); *F05D 2300/10* (2013.01); *F05D 2300/2118* (2013.01); *F05D 2300/5023* (2013.01); *Y02T 50/60* (2013.01)

(56) References Cited

U.S. PATENT DOCUMENTS

| | | | |
|---|---|---|---|
| 6,102,656 A * | 8/2000 | Nissley | C23C 4/02 |
| | | | 415/174.4 |
| 6,284,323 B1 | 9/2001 | Maloney | |
| 6,306,524 B1 * | 10/2001 | Spitsberg | B32B 15/01 |
| | | | 428/621 |
| 7,662,489 B2 | 2/2010 | Litton et al. | |
| 8,343,587 B2 | 1/2013 | Litton et al. | |
| 8,506,243 B2 | 8/2013 | Strock et al. | |
| 8,535,783 B2 | 9/2013 | Lutjen et al. | |
| 2003/0170119 A1 | 9/2003 | Fried | |
| 2008/0138658 A1 | 6/2008 | Litton et al. | |
| 2008/0145674 A1 * | 6/2008 | Darolia | F01D 5/288 |
| | | | 428/433 |
| 2010/0098865 A1 | 4/2010 | Litton et al. | |
| 2011/0116920 A1 * | 5/2011 | Strock | C23C 28/00 |
| | | | 415/229 |
| 2011/0300342 A1 * | 12/2011 | Lutjen | C23C 28/3215 |
| | | | 428/173 |
| 2013/0224453 A1 * | 8/2013 | Hazel | C23C 4/11 |
| | | | 428/212 |

OTHER PUBLICATIONS

International Search Report for International Application No. PCT/US2014/056061, Mailed Dec. 10, 2014.

Written Opinion for International Application No. PCT/US2014/056061, Mailed Dec. 10, 2014.

* cited by examiner

SEGMENTED CERAMIC COATING INTERLAYER

RELATED APPLICATIONS

This application claims the benefit of and priority to U.S. Provisional Patent Application No. 61/885,757 filed Oct. 2, 2013, the contents of which are incorporated herein by reference in their entirety.

BACKGROUND OF THE INVENTION

1. Field of the Invention

The present disclosure relates to thermally insulating coatings, and more particularly to coatings for enhanced heat resistance in gas turbine engines, for example.

2. Description of Related Art

Components that are exposed to high temperatures, such as a component within a gas turbine engine, typically include protective coatings. For example, components such as turbine blades, turbine vanes, blade outer air seals, and combustor components typically include one or more coating layers that function to protect the component from erosion, oxidation, corrosion or the like to thereby enhance component durability and maintain efficient operation of the engine.

As an example, some conventional turbine blade outer air seals include an abradable ceramic coating that contacts tips of the turbine blades such that the blades abrade the coating upon operation of the engine. The abrasion between the outer air seal and the blade tips provides a minimum clearance between these components such that gas flow around the tips of the blades is reduced to thereby maintain engine efficiency. Over time, internal stresses can develop in the protective coating to make the coating vulnerable to erosion and spalling. The outer air seal may then need to be replaced or refurbished after a period of use.

Such conventional methods and systems have generally been considered satisfactory for their intended purpose. However, there is still a need in the art for a protective thermally insulating coating that allows for improved erosion resistance when exposed to high temperatures. There also remains a need in the art for such systems and methods that are easy to make and use. The present disclosure provides a solution for these problems.

SUMMARY OF THE INVENTION

A turbine article includes a substrate with a geometric surface feature having a plurality of recesses recessed into the substrate. A ceramic topcoat is disposed over the geometric surface feature. The topcoat includes portions that are separated by faults extending through the topcoat from the geometric surface feature, e.g., creating a segmented thermally insulating topcoat. A ceramic interlayer is disposed between the topcoat and the geometric surface feature.

In certain embodiments, the interlayer is a toughened ceramic interlayer. The ceramic interlayer can be disposed between the topcoat and a bond coat disposed inboard of the substrate. The ceramic interlayer can be $2.54 \times 10^{-6}$ to $7.62 \times 10^{-5}$ meters (0.1 to 3.0 mils) thick, with a specific example being 1 mil ($2.54 \times 10^{-5}$) thick. The ceramic interlayer may be composed of 7 to 8 wt % yttria stabilized zirconia or other oxide ceramic materials, as these materials have high toughness and good thermal stability. Any other suitable materials can be used.

In certain embodiments, an erosion resistant thermal barrier layer is applied inboard of the interlayer. This can act as an erosion resistant layer having properties of a thermal barrier coating (E-TBC) layer. The E-TBC layer can be disposed between the topcoat and the interlayer, which can be disposed inboard of a bond coat coating the substrate. The erosion resistant thermal barrier coating (E-TBC) layer may be composed of yttrium stabilized zirconium, gadolinia zirconate, or any other suitable material. The E-TBC layer can be $2.54 \times 10$–$5$ to $3.81 \times 10^{-4}$ meters (1.0 to 15 mils) thick, with a specific example being 8 mils ($2.032 \times 10^{-4}$) thick of 7 wt % YSZ at less than 6% porosity. It is contemplated that the E-TBC layer can be sprayed with up to 15% porosity, with 10% being suitable for certain applications, however any other suitable porosity can be used. It is also contemplated that each of the interlayer and topcoat can include a material including at least one of yttrium stabilized zirconium and gadolinia zirconate. The topcoat can be as thin as about 5 mils ($1.27 \times 10^{-4}$ meters), however in certain applications it is desirable to apply enough so that when the coating surface is ground smooth to remove the raised material on the substrate features, 5 to 80 mils ($1.27 \times 10^{-4}$ to $2.032 \times 10^{-3}$ meters) of topcoat is left above the prior coating layer on top of the raised substrate features. One suitable example is a topcoat layer 15 mils ($3.81 \times 10^{-4}$ meters) thick above the highest portion of the prior layer. One exemplary topcoat can include 7YSZ at 15% porosity, deposited with poly-methyl-methacrylate fugitive particles. Another exemplary topcoat includes 40 wt % GdZrOx at 8% porosity.

In certain embodiments, each of the recesses can include a substantially uniform recess depth extending into the substrate surface and a recess width, wherein the ratio of the recess width to the recess depth is 1 to 10, with the recess depth being at least 0.01 inches (0.254 millimeters). In certain embodiments, the substrate can be metallic. It is also contemplated that the ceramic interlayer can be erosion resistant.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
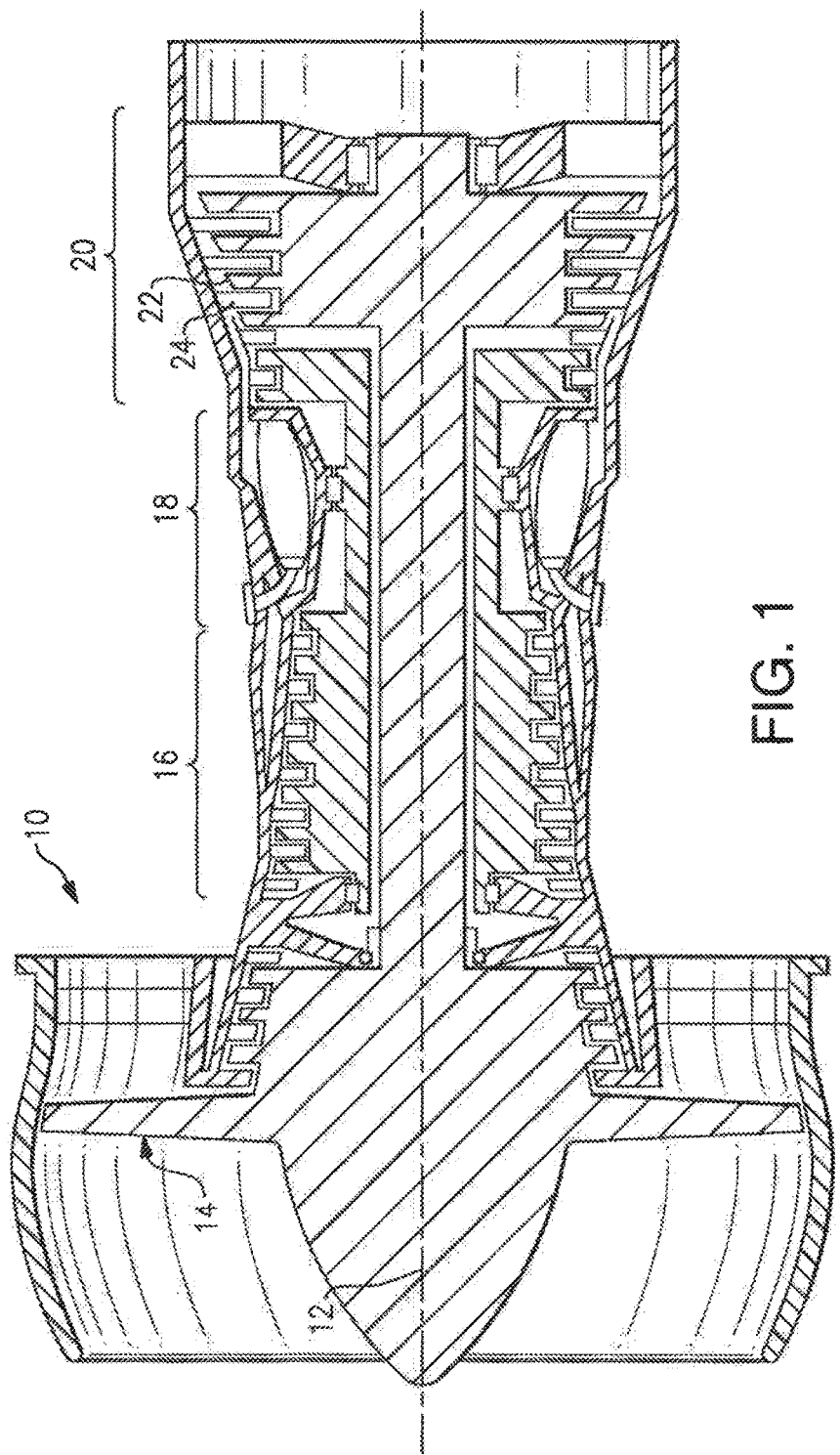
FIG. 1 is a schematic view of an exemplary large gas turbine engine.

Reference will now be made to the drawings wherein like reference numerals identify similar structural features or aspects of the subject disclosure. For purposes of explanation and illustration, and not limitation, a partial view of an exemplary embodiment of the ceramic interlayer in accordance with the disclosure is shown in FIG. 3 and is designated generally by reference character 100.

FIG. 1 illustrates selected portions of an example gas turbine engine 10 used for propulsion. In this example, the gas turbine engine 10 is circumferentially disposed about an engine centerline 12. The engine 10 may include a fan 14, a compressor 16, a combustion section 18, and a turbine section 20 that includes rotating turbine blades 22 and static turbine vanes 24. It is to be understood that other types of engines may also benefit from the examples disclosed herein, such as engines that do not include a fan or engines having other types of compressors, combustors, and turbines than shown.

Figure 2:
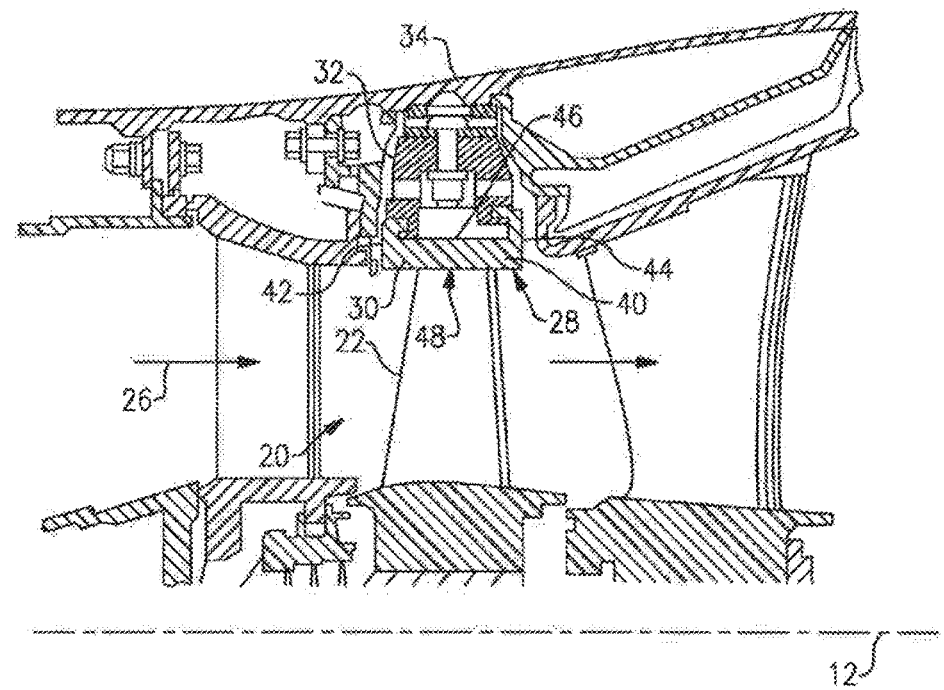
FIG. 2 is a schematic view of a turbine section of the engine of FIG. 1.

FIG. 2 illustrates selected portions of the turbine section 20. The turbine blades 22 receive a hot gas flow 26 from the combustion section 18 (shown in FIG. 1). The turbine section 20 includes a blade outer air seal system 28, having a plurality of seal members 30, or gas turbine articles, that function as an outer wall for the hot gas flow 26 through the turbine section 20. Each seal member 30 is secured to a support 32, which is in turn secured to a case 34 that generally surrounds the turbine section 20. For example, a plurality of the seal members 30 may be arranged circumferentially about the turbine section 20. It is to be understood that the seal member 30 is only one example of an article in the gas turbine engine and that any other suitable articles may benefit from the techniques disclosed herein, such as turbine blades, turbine vanes, turbine blade outer air seals and combustor components. Additional applications can include afterburner exhaust guides, rocket nozzles, industrial combustion nozzles and heat shields such as in coal gasification and other elevated temperature reactors.

Figure 3:
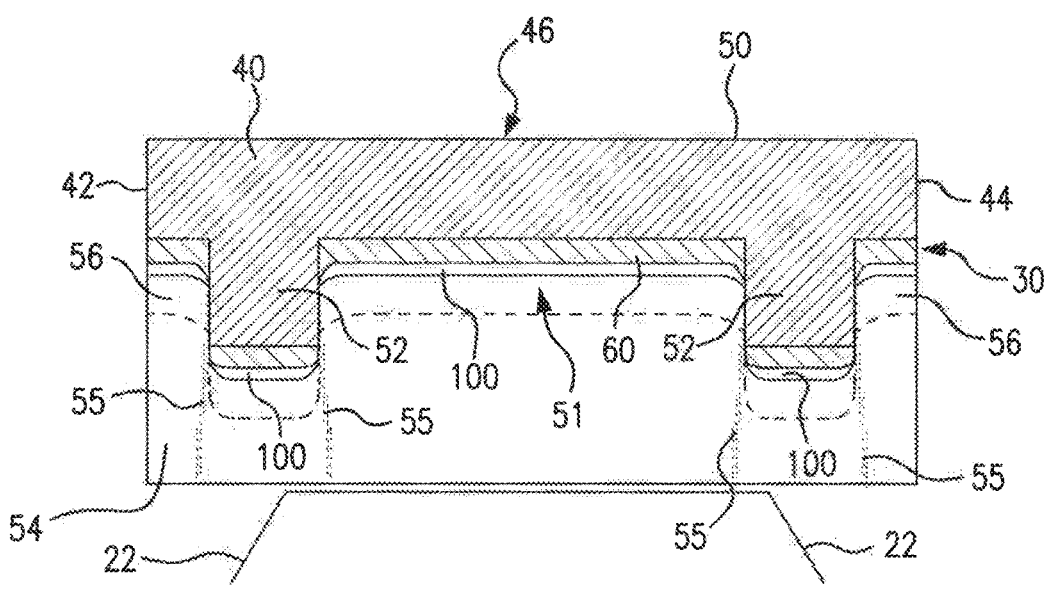
FIG. 3 is a schematic cross-sectional side elevation view of a portion of an exemplary embodiment of a turbine article constructed in accordance with the present disclosure.

FIG. 3 illustrates a portion of the seal member 30 having a circumferential portion 40, a leading portion 42, a trailing portion 44, a radially outer side 46, and a radially inner side 48 that is adjacent to the hot gas flow 26. FIG. 3 only shows a portion of seal member 30 in the axial direction, i.e., seal member 30 extends beyond leading portion 42 and trailing portion 44. The term "radially" as used in this disclosure relates to the orientation of a particular side with reference to the engine centerline 12 of the gas turbine engine 10.

The seal member 30 includes a substrate 50, a surface feature 52 with a plurality of recesses 51 formed, e.g., recessed, into the substrate 50 on the gas path side of the seal member 30. FIG. 1 shows one such recess 51, wherein the surface feature 52 surrounds recess 51. For example, recess 51 can be a cylindrical recess set inward from the surface of surface feature 52. Multiple recesses 51 can be defined in the surface of surface feature 52, e.g., in a honeycomb pattern or any other suitable pattern. It is contemplated that surface feature 52 can be a single continuous feature, as in the raised portion between cells of a honeycomb structure. It is also contemplated that surface feature 52 can be discontinuous, as in multiple raised annular surfaces, each surrounding a respective recess, for example. Substrate 50 can be metallic, for example it can include INCONEL 718 available from Special Metals, Corp. of Miami, Florida, PWA1484 available from WA Specialty Alloys Pty Ltd of Canning Vale, Western Australia, or any other suitable alloy. It is also contemplated that substrate 50 can be ceramic, e.g., of monolithic ceramics such as aluminum oxide or silicon carbide (SiC) and ceramic reinforced ceramic matrix composites such as SiC—SiC. For ceramic substrate applications, the bond coat 60 described below may be optional. In ceramic substrate applications, the methods and benefits of creating the interlayer described herein are similar to those for metallic substrate applications using a bond coat 60 as described below. The base part, i.e., the main circumferential portion 40 and raised/recessed features, i.e., recess 51 and surface feature 52, may optionally be composed of different materials. Each material may contribute different desirable properties such as structural strength and oxidation resistance. One example is a PWA1386 (available from Sulzer Metco (US) Inc. of Westbury, New York) composition layer that can form the geometry layer, i.e., surface feature 52. This can be applied by HVOF (high velocity oxygen fuel spraying) and diffusion heat treatment, for example. It is also contemplated that surface feature 52 may be made by additive manufacturing methods such as DLMS (direct laser metal sintering), brazing, or diffusion bonding.

A topcoat 54 is disposed over feature 52. It is to be understood that the surface feature 52 is not necessarily shown to scale. Moreover, the substrate 50 may include attachment features for mounting the seal member within the gas turbine engine 10. Additional features of the topcoat 54 and substrate 50 can be found in U.S. Pat. No. 8,506,243, which is incorporated by reference herein in its entirety. U.S. Pat. No. 8,535,783 is also incorporated by reference herein in its entirety. Additionally, each of U.S. Pat. Nos. 6,284,323; 7,662,489; 8,343,587; and U.S. Patent Application Publication Nos. 2008/0138658 and 2010/0098865 is incorporated by reference herein in its entirety.

While ceramic topcoat materials have demonstrated high temperature durability in thermal cycle testing, additional cracking may occur. To further improve the spallation resistance and stability of tip clearance in real engine environments, a ceramic interlayer 100 is disposed between topcoat 54 and the geometric surface feature 52. A bond coat 60 is disposed between topcoat 54 and substrate 50. The ceramic interlayer 100 is disposed between topcoat 54 and the bond coat 60 disposed inboard of substrate 50. Topcoat 54 includes portions that are separated by faults 55 extending through topcoat 54 from the geometric surface feature 52 so the topcoat is segmented. It should be noted that faults 55 can extend through all the layers inboard of substrate 50, e.g., from the bottom of the recesses 51 and/or inboard of surface feature 52. This segmented structure allows ceramics, even dense ceramics, to be built up and to survive engine operation at larger thicknesses than previous techniques.

As indicated by the dashed line in FIG. 3, optionally an erosion resistant thermal barrier coating (E-TBC) layer 56 is disposed between topcoat 54 and interlayer 100. The erosion resistant thermal barrier coating (E-TBC) layer 56 can be $2.54 \times 10$-5 to $3.81 \times 10^{-4}$ meters (1.0 to 15 mils) thick, with a specific example being 8 mils ($2.032 \times 10^{-4}$) thick of 7 wt % YSZ at less than 6% porosity. It is contemplated that the erosion resistant thermal barrier coating (E-TBC) layer 56 can be sprayed with up to 15% porosity, with 10% being suitable for certain applications, however any other suitable porosity can be used. The erosion resistant thermal barrier coating (E-TBC) layer 56 can include any suitable material such as yttrium stabilized zirconium or gadolinia zirconate.

It is also contemplated that each of the interlayer 100 and topcoat 54 can include a material including at least one of yttrium stabilized zirconium and gadolinia zirconate. The topcoat 54 can be as thin as about 5 mils ($1.27 \times 10^{-4}$ meters), however in certain applications it is desirable to apply enough so that when the coating surface is ground smooth to remove the raised material on the substrate features, 5 to 80 mils ($1.27 \times 10^{-4}$ to $2.032 \times 10^{-3}$ meters) of topcoat is left above the prior coating layer on top of the raised substrate features. One suitable example is a topcoat layer 15 mils ($3.81\times10^{-4}$ meters) thick above the highest portion of the prior layer. One exemplary topcoat 54 can include 7YSZ at 15% porosity, deposited with poly-methyl-methacrylate fugitive particles. Another exemplary topcoat 54 includes 40 wt % GdZrOx at 8% porosity.

Ceramic interlayer 100 can be applied with a near line of sight coating process during which ceramic interlayer 100 is deposited on the high and low coplanar surfaces that are generally perpendicular to the spray stream. In applications where topcoat 54 serves as a thermal barrier, the ceramic interlayer 100 is preheated to at least 800° F. and coated with fine, hot thermal barrier coating particles to impart strong inter-particle bonding to create a toughened, erosion resistant ceramic layer, i.e., topcoat 54.

The ceramic interlayer may be composed of 7 to 8 wt % yttria stabilized zirconia or other oxide ceramic materials, as these materials have high toughness and good thermal stability. Any other suitable materials can be used. The result of the process is a ceramic interlayer 100 of $2.54\times10^{-6}$ to $7.62\times10^{-5}$ meters (0.1 to 3.0 mils) thick, with a specific example being 1 mil ($2.54\times10^{-5}$) thick, in the highest stress location of the ceramic layers. This helps to delay initiation and slow the propagation of cracks that cause delamination. The erosion resistance of the ceramic interlayer 100 provides stable post rub protection to the bond coat 60 and the substrate 50, which may be metallic. In applications including the optional erosion resistant thermal barrier coating (E-TBC) layer 56, these functions can be provided by the erosion resistant thermal barrier coating (E-TBC) layer 56. In blade outer air seal applications, the erosion resistance also helps maintain stable tip clearance during service and will improve thrust specific fuel consumption over the lifetime of the engine. In purely thermal barrier applications, the erosion resistance in erosion resistant thermal barrier coating (E-TBC) layer 56 helps to protect the parts in the event that a more erosion prone topcoat is removed by exposure to erosive conditions.

It is contemplated that the topcoat 54 can be a thermal barrier coating (TBC). In such applications, the entire thickness of the topcoat 54 can be made of thermal barrier coating materials. It is also contemplated that topcoat 54 can be made of an abradable material. In other words, topcoat 54 can be thermally insulating and/or abradable. For example, where the optional erosion resistant thermal barrier coating (E-TBC) layer 56 is included, the topcoat 54 can serve to be thermally insulating. In applications where topcoat 54 serves as thermal barrier coating (TBC), the topcoat material may be dense but need not necessarily including an abradable material.

The methods and systems of the present disclosure, as described above and shown in the drawings, provide for a ceramic interlayer with superior properties including increased erosion resistance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A turbine article comprising:
   a substrate with a geometric surface feature having a plurality of recesses recessed into the substrate;
   a ceramic topcoat disposed over the geometric surface feature, the topcoat including portions that are separated by faults extending through the topcoat from the geometric surface feature so the topcoat is segmented; and
   a ceramic interlayer having a thickness of $2.54\times10^{-6}$ to $7.62\times10^{-5}$ meters (0.1 to 3.0 mils) disposed between the topcoat and the geometric surface feature, the ceramic interlayer including portions that are separated by faults extending through the ceramic interlayer from the geometric surface feature so the ceramic interlayer is segmented wherein the ceramic interlayer consists of 7 to 8 wt % yttria stabilized zirconia;
   wherein the ceramic interlayer is disposed on high and low coplanar surfaces with respect to the geometric surface feature; and
   wherein the ceramic interlayer is coated with fine, hot thermal barrier coating particles that impart strong inter-particle bonding and provide a toughened, erosion resistant ceramic topcoat.

2. A turbine article as recited in claim 1, wherein the interlayer is a toughened ceramic interlayer.

3. A turbine article as recited in claim 1, wherein the ceramic interlayer is disposed between the topcoat and a bond coat disposed inboard of the substrate.

4. A turbine article as recited in claim 1, wherein each of the recesses includes a substantially uniform recess depth extending into the substrate and a recess width, wherein the ratio of the recess width to the recess depth is 1 to 10, with the recess depth being at least 0.01 inches (0.254 millimeters).

5. A turbine article as recited in claim 1, wherein the substrate is metallic.

6. A turbine article comprising:
   a substrate with a geometric surface feature having a plurality of recesses recessed into the substrate;
   a ceramic topcoat disposed over the geometric surface feature, the topcoat including portions that are separated by faults extending through the topcoat from the geometric surface feature so the topcoat is segmented;
   a ceramic interlayer having a thickness of $2.54\times10^{-6}$ to $7.62\times10^{-5}$ meters (0.1 to 3.0 mils) disposed between the topcoat and the geometric surface feature, the ceramic interlayer including portions that are separated by faults extending through the ceramic interlayer from the geometric surface feature so the ceramic interlayer is segmented; and
   an erosion resistant thermal barrier coating (E-TBC) layer between the topcoat and the interlayer, the erosion resistant thermal barrier coating layer including portions that are separated by faults extending through the erosion resistant thermal barrier coating from the geometric surface feature so the erosion resistant thermal barrier coating layer is segmented, wherein the ceramic interlayer consists of 7 to 8 wt % yttria stabilized zirconia and the ceramic topcoat consists of 7 wt % yttria stabilized zirconia or gadolinia zirconate and the ceramic topcoat does not include abradable material;
   wherein the ceramic interlayer is disposed on high and low coplanar surfaces with respect to the geometric surface feature.

7. A turbine article as recited in claim 6, wherein the interlayer is disposed between the topcoat and a bond coat disposed inboard of the substrate.

8. A turbine article as recited in claim 6, wherein the erosion resistant thermal barrier coating (E-TBC) layer is $2.54\times10^{-5}$ to $3.81\times10^{-4}$ (1.0 to 15 mils) thick).

9. A turbine article as recited in claim 6, wherein the erosion resistant thermal barrier coating (E-TBC) layer includes a material including at least one of yttrium stabilized zirconium and gadolinia zirconate.

10. A turbine article consisting of:
a substrate with a geometric surface feature having a plurality of recesses recessed into the substrate;
a ceramic topcoat disposed over the geometric surface feature, the topcoat including portions that are separated by faults extending through the topcoat from the geometric surface feature so the topcoat is segmented;
a bond coat;
a ceramic interlayer having a thickness of $2.54 \times 10^{-6}$ to $7.62 \times 10^{-5}$ meters (0.1 to 3.0 mils) disposed between the top coat and the bond coat, the ceramic interlayer including portions that are separated by faults extending through the ceramic interlayer from the geometric surface feature so the ceramic interlayer is segmented; and
an erosion resistant thermal barrier coating between the ceramic topcoat and the ceramic interlayer, the erosion resistant thermal barrier coating including portions that are separated by faults extending through the erosion resistant thermal barrier coating from the geometric surface feature so the erosion resistant thermal barrier coating is segmented;
wherein the ceramic interlayer is disposed on high and low coplanar surfaces with respect to the geometric surface feature.

* * * * *